United States Patent Office 3,833,633
Patented Sept. 3, 1974

3,833,633
PEROXY CONTAINING SILANES
William John Owen, Penarth, and Bryan Ewart Cooper, Bridgend, Glamorgan, Wales, assignors to Dow Corning Limited, London, England
No Drawing. Filed Sept. 22, 1972, Ser. No. 291,510
Claims priority, application United Kingdom, Sept. 29, 1971, 45,320/71; May 2, 1972, 20,311/72
Int. Cl. C07f 7/08, 7/18
U.S. Cl. 260—448.2 B                    4 Claims

ABSTRACT OF THE DISCLOSURE

Organosilicon compounds containing the peroxide grouping in the molecule. The compounds have the general formula $$R_nX_{3-n}SiR'OOR''$$

in which R is alkyl or phenyl, X is alkoxy, alkoxyalkoxy or t-alkylperoxy, $n$ is 0, 1 or 2, R' is a specified divalent organic radical and R'' is t-alkyl, t-aralkyl, acyl or aroyl. The compounds are useful as curing agents for organic resins, polymerisation initiators for organic monomers and as coupling agents for improving the bonding of unsaturated organic resins to inorganic substrates.

---

This invention relates to novel organosilicon compounds having peroxide groups, to processes for preparing such compounds and to certain uses of the compounds.

According to this invention there are provided organosilicon compounds of the general formula $$R_nX_{3-n}SiR'OOR''$$

wherein R represents an alkyl radical having less than 19 carbon atoms or a phenyl radical, X represents an alkoxy, alkoxyalkoxy or tertiary-alkyl peroxy radical, R' represents a divalent radical having from 2 to 11 inclusive carbon atoms and composed of carbon, hydrogen and optionally oxygen, any oxygen being present as ether linkages, or represents a radical $$-QO\overset{O}{\underset{\|}{C}}-$$

or the radical $$-QNZ\overset{O}{\underset{\|}{C}}-$$

in which Q represents a divalent radical attached to silicon through a silicon to carbon bond, having from 2 to 10 inclusive carbon atoms and composed of carbon, hydrogen and optionally chlorine and oxygen, any oxygen present in Q being in the form of ether linkages, and Z represents a hydrogen atom or an alkyl radical having less than 19 carbon atoms, R'' represents a tertiary-alkyl or tertiary-aralkyl radical having less than 18 carbon atoms and when R' is $$-QO\overset{O}{\underset{\|}{C}}-\text{ or }-QNZ\overset{O}{\underset{\|}{C}}-$$

may also represent an acyl or aroyl radical having less than 8 carbon atoms and $n$ is 0, 1 or 2.

In the general formula of the compounds of this invention R represents the phenyl radical or an alkyl radical having less than 19 carbon atoms e.g. methyl, ethyl, propyl, butyl, nonyl, dodecyl and octadecyl. The substituent X may be any alkoxy or alkoxyalkoxy radical, e.g. methoxy, ethoxy, isopropoxy, butoxy, hexoxy and methoxyethoxy or tertiary alkyl peroxy radical e.g. t-butyl peroxy or t-amyl peroxy. In the general formula R' may be, for example, $$-(CH_2)_3-, -(CH_2)_4-, -CH_2CH.CH_3CH_2-, -(CH_2)_3OCH_2CH_2-'$$

$$-(CH_2)_3-\!\!\left\langle\!\!\!\!\bigcirc\!\!\!\!\right\rangle\!\!-O\overset{O}{\underset{\|}{C}}-, -(CH_2)_3OCH_2CHClCH_2O\overset{O}{\underset{\|}{C}}-,$$

$$-(CH_2)_3O\overset{O}{\underset{\|}{C}}-, -CH_2CH_3CHCH_2O\overset{O}{\underset{\|}{C}}-, -(CH_2)_4O\overset{O}{\underset{\|}{C}}-,$$

$$-(CH_2)_3NH\overset{O}{\underset{\|}{C}}-, -(CH_2)_4NC_2H_5\overset{O}{\underset{\|}{C}}- \text{ or}$$

$$-CH_2CH_2O(CH_2)_3NH\overset{O}{\underset{\|}{C}}-,$$

The substituent R'' may be, for example, a tertiary butyl, t-amyl, t-nonyl, cumyl, acetyl, propionyl or benzoyl radical and Z may be any alkyl radical having less than 19 carbon atoms as exemplified for R. Preferably R'' represents the t-butyl radical. It is also preferred, particularly when the compounds of this invention are intended for use as coupling agents, that X represents an alkoxy or alkoxyalkoxy radical having from 1 to 3 inclusive carbon atoms and $n$ is 0.

The organosilicon compounds of this invention may be prepared by several methods. Compounds in which R' represents a divalent radical composed of carbon, hydrogen and, optionally, oxygen in the form of ether linkages and R'' represents a t-alkyl or t-aralkyl radical may be prepared by the reaction of a silane having a silicon-bonded hydrogen atom with an unsaturated organic peroxide. Included within the scope of this invention therefore is a process for the preparation of such compounds which comprises reacting (i) a silane of the general formula $HSiX_{3-n}R_n$ with (ii) an organic peroxide of the general formula YOOR'', wherein in the general formulae R, X and $n$ are as defined hereinabove, R'' represents a tertiary-alkyl or tertiary aralkyl radical and Y represents a monovalent radical containing olefinic unsaturation, composed of carbon, hydrogen and, optionally, oxygen in the form of ether linkages, and having from 2 to 11 inclusive carbon atoms.

The reaction between (i) and (ii) involves the addition of the silicon-based hydrogen atom to the unsaturated radical Y in the organic peroxide. This reaction may be carried out in the presence of any of the catalysts known for use in ≡SiH addition reactions. Particularly suitable are the platinum metals as compounds or complexes of platinum metals for example platinum, platinum on charcoal, platinum on alumina, chloroplatinic acid, complexes of platinic chloride and compounds containing olefinic unsaturation e.g. cyclohexene and organosiloxanes having silicon-bonded vinyl radicals, ruthenium, rhodium, palladium acetyl acetonate and diethylene rhodium (I) acetyl acetonate. Such catalysts and their application in reactions involving the addition of ≡SiH groups to unsaturated compounds are well known in the art. The preferred catalyst is chloroplatinic acid.

If desired organic solvents, for example toluene, xylene or petroleum ether may be employed to facilitate the reaction or recovery of the reaction product.

Compounds in which R' represents the $$-QO\overset{O}{\underset{\|}{C}}-$$

radical and R'' is t-alkyl or t-aralkyl may be prepared by the reaction of an organic hydroperoxide and an organosilicon chloroformate. Compounds in which R' represents the $$-QNZ.\overset{O}{\underset{\|}{C}}-$$

radical, wherein Z is hydrogen, and R'' is t-alkyl or t-aralkyl may be prepared by the reaction of an organic hydroperoxide and an organosilicon isocyanate. The corresponding organosilicon compounds of both types in which R'' represents an acyl or aroyl radical may be obtained by replacing the organic hydroperoxide reactant with an organic peroxyacid.

According to a further aspect therefore this invention provides a process for the preparation of the organosilicon compounds of the invention wherein R' represents the

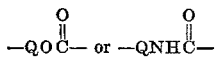

radicals, in which Q is as defined hereinabove, said process comprising reacting (a) a silane of the general formula $R_nX_{3-n}SiQO.CO.Cl$ or of the general formula $$R_nX_{3-n}SiQNCO$$

wherein R, X, Q and $n$ are as hereinabove defined with (b) a peroxide compound of the general formula HOOG wherein G represents a tertiary alkyl or tertiary aralkyl radical having less than 18 carbon atoms or an acyl or aroyl radical having less than 8 carbon atoms.

In the general formula of the chloroformate and isocyanate reactants (a) Q may represent, for example

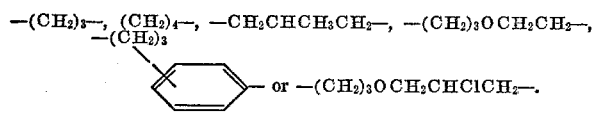

Methods for preparing the organisilicon chloroformates are known in the art and are described for example in Doklady Akad. Nauk. S.S.S.R. Vol. 178 (2), page 358. Methods for preparing the organosilicon isocyanates are also well known, see for example U.K. Pat. No. 1,084,855.

The peroxide compound reactants (b) are also well known materials and include, for example, hydrogen peroxide, tertiary-butyl hydroperoxide, cumyl hydroperoxide, peracetic acid and perbenzoic acid, t-butyl hydroperoxide being preferred.

When the reactant (a) is an organosilicon chloroformate the reaction between (a) and (b) may be carried out at any temperature in the range from about $-20°$ C. to $70°$ C. Preferably the reaction is carried out at a temperature of from $-15°$ C. to $+15°$ C. Preferably also a hydrogen halide acceptor e.g. pyridine or triethylamine is included in the reaction mixture to neutralise the by-produced HCl. The reaction is also best carried out in the presence of an organic solvent, for example a hydrocarbon or an ether e.g. toluene, xylene, pentane, diethyl ether or petroleum ether. For optimum yields the reaction is carried out using a stoichiometric equivalence or slight excess of the peroxide reactant (ii).

When reactant (a) is an organosilicon isocyanate the reaction between (a) and (b) is preferably carried out in the presence of a basic catalyst e.g. triethylamine, pyridine or other organic or organosilicon amine which is inert to the reactants. The reaction is conveniently performed at a temperature in the range from about 10 to $50°$ C. The actual temperature employed is, however, not critical and temperatures outside this range may also be used. If desired organic solvents, for example, toluene, xylene, benzene or petroleum may be employed to facilitate the reaction or recovery of the product.

Compounds of the invention wherein R' represents the group —QNZ.CO— in which Z is an alkyl radical may be obtained by the reaction of the corresponding organosilicon carbamoyl chloride with an organic hydroperoxide or an organic peroxyacid. This invention therefore further includes a process for the preparation of such compounds which comprises reacting (c) a compound of the general formula $R_nX_{3-n}SiQNZCO.Cl$ with (d) a peroxide compound of the general formula HOOG, wherein R, X, Q, $n$ and G are as hereinabove defined and Z represents an alkyl radical having less than 19 carbon atoms.

The reaction between the carbamoyl chloride and the peroxide compound is best carried out in the presence of an organic solvent and an acceptor, e.g. pyridine, for the by-produced hydrogen halide. The organosilicon carbamoyl chloride reactant may be prepared by the reaction of phosgene on an organosilicon amino compound of the formula $R_nSiX_{3-n}QHNZ$.

The compounds of this invention are useful as curing agents for unsaturated organic resins e.g. polyesters. They are also useful as polymerisation initiators for organic monomers and as intermediates for use in the preparation of the corresponding peroxide-substituted organosiloxanes. The organosiloxanes are themselves useful as curing agents and polyerisation initiators.

Compounds of the invention wherein X represents an alkoxy or alkoxyalkoxy radical having from 1 to 3 inclusive carbon atoms and $n$ is 0 or 1 are of particular utility as coupling agents, that is for improving the bonding of unsaturated organic resins, especially unsaturated polyester resins, to inorganic materials, for example glass fibres, silicas, other inorganic oxides and metals. They may be employed in this application according to known techniques, and may be used alone or in conjunction with other sizes. Thus, for example they may be applied as a size, or as an ingredient of a size composition, to glass fibres which are then employed in the manufacture of glass-reinforced resin laminates. Alternatively the improved bonding effect may be obtained by adding the organosilicon compound to the organic resin. In such an application the silicon compound may be added to the resin alone or in conjunction with other substances e.g. known silane coupling agents or organic peroxide curing agents. When incorporated into the resin the organosilicon compound is preferably added in a proportion of from 0.05 to 5% by weight based on the weight of organic resin.

The following examples, in which $Me=CH_3$ and $t—Bu=t—C_4H_9$, illustrates the invention.

EXAMPLE 1

Allyl t-butylperoxide was prepared by the method of Campbell, T. W. and Coppinger, G. M., Jour. Am. Chem. Soc. 73 1788 (1951).

Trimethoxysilane (24.4 g., 0.2 mole) was added to allyl-t-butylperoxide (26 g., 0.2 mole) and chloroplatinic acid (10 $\mu$l. of a 10% by weight solution in isopropyl alcohol) over a period of 2 hours. An exothermic reaction occurred. When addition of the trimethoxysilane was complete, the reaction mixture was heated to $50°$ C. for a further 3 hours. Volatile products, including unreacted starting materials, were then removed under reduced pressure (30 mm. Hg $30°$ C.) to yield trimethoxysilylpropyl-t-butyl peroxide (15 g., 30%). Elemental analysis gave Si(found) 10.5% (calc) 11.1%. The I.R. and N.M.R. spectra were consistent with the proposed structure.

EXAMPLE 2

3-Trimethoxysilylpropyl chloroformate $$[(MeO)_3Si(CH_2)_3OC(O)Cl]$$

(24.2 g., 0.1 mole) was added at $0°$ C. to a solution of t-butyl hydroperoxide (9.0 g., 0.1 mole) and pyridine (7.9 g., 0.1 mole) in diethyl ether (100 ml.). The mixture was stirred for 3 hours whilst being maintained at $0°$ C. and the pyridine hydrochloride removed by filtration. The ether solvent was removed under vacuum, replaced by pentane and the solution filtered again.

When the solvent was again removed under vacuum there was obtained t-butyl 3-trimethoxysilylpropyl peroxycarbonate $[(MeO)_3Si(CH_2)_3O \cdot C(O)OOt—Bu]$, (19 g., 64%).

Found; MeO, 28.5%; —O—O—, 9.6%
Calculated; MeO, 31.4%; —O—O—, 10.8%.

The I.R. and N.M.R. spectra were consistent with the proposed structure. Decomposition temperature of the compound was 120° C.

Styrene (10 g.) was heated for 16 hrs. at 90° C. with (MeO)₃Si(CH₂)₃OC(O)OOt—Bu (0.2 g.). The product, a hard, brittle solid, was heated under reflux in an aqueous emulsion (2%) of dibutyltin dilaurate for 24 hrs. The product had a gel content (insoluble in refluxing xylene for 20 hrs.) of 22%.

EXAMPLE 3

3-Trimethoxysilylpropyl isocyanate

(6.15 g., 0.03 mole) was added at 0° C. to a solution of t-butyl hydroperoxide (3.60 g., 0.04 mole) and triethylamine (1 ml.) in diethyl ether (30 ml.). The mixture was stirred at room temperature (20° C.) for 20 hours. It was then filtered and the solvent removed under vacuum to leave t-butyl 3-trimethoxysilylpropyl peroxycarbamate (6.0 g., 68%).

Found; —O—O—, 10.6%
Calculated; —O—O—, 10.8%.

The I.R. and N.M.R. spectra were consistent with the proposed structure of the compound.

EXAMPLE 4

O - (gamma-trimethoxysilylpropyl)phenyl chloroformate (6.4 g., 0.2 mole) was added to a solution of t-butyl hydroperoxide (2.7 g., 0.03 mole) and pyridine (1.6 g., 0.02 mole) in ether (40 ml.) at 0° C. A white precipitate formed immediately.

The mixture was stirred for 2 hr., filtered and the solvent removed under vacuum to leave

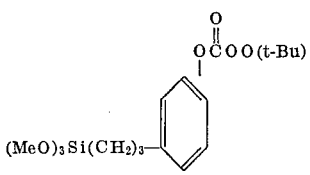

Analysis by N.M.R. showed the product to be approximately 70% pure.

EXAMPLE 5

A series of 12 ply glasscloth (116–T)/polyester (Cellobond A250) laminates was prepared by conventional laminating techniques. In Laminate A the glass cloth was sized before use by dipping in a 1% by weight solution of (CH₃O)₃Si(CH₂)₃OC(O)OO(t-C₄H₉) in diethyl ether and 1% by weight of t-butylisopropyl percarbonate was added to the resin as curing agent. Laminate B was prepared from glasscloth sized as for Laminate A but no t-butylisopropyl percarbonate was added to the resin. For comparative purposes Laminates C and D were similarly prepared using resin catalysed with 1% by weight of t-butylisopropyl percarbonate. In Laminate C the glasscloth was sized with a known glass size.

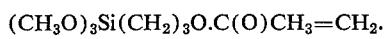

The glasscloth used in Laminate D was not sized.

The laminae were pressed together at 130° C. for 20 minutes to 0.125 inch stops. The laminates were then subjected to a post cure in an oven at 120° C. for 2 hours and the flexural strengths measured at room temperature according to A.S.T.M. D790–63 using an Instron test instrument. The flexural strengths of the laminates were also measured following a 2 hour immersion in boiling water.

The results obtained are shown in the following table.

| Laminate | Percent glass content of laminate | Flexural strength, p.s.i. Untreated | Flexural strength, p.s.i. After boil | Percent retention |
|---|---|---|---|---|
| A | 61.4 | 54,500 | 43,700 | 80 |
| B | 67.0 | 38,100 | 36,600 | 96 |
| C | 59.0 | 53,400 | 48,300 | 91 |
| D | 61.8 | 42,000 | 30,800 | 73 |

EXAMPLE 6

A 12 ply glasscloth (116–T)/polyester (Cellobond A250) laminate was prepared using conventional laminating techniques. Prior to preparing the laminate the silane prepared in Example 2 was added to the resin in a proportion of 1% by weight, based on the weight of the resin. The laminae were pressed together at 130° C. for 20 minutes to 0.125 inch stops. For comparative purposes a similar laminate was prepared using resin which contained no silane.

After subjecting the laminates to a post cure in an oven at 120° C. for 2 hours their flexural strengths were measured as described in Example 5. The results were as follows.

| Laminate | Percent glass | Flexural strength, p.s.i. As prepared | Flexural strength, p.s.i. After boil | Percent retention |
|---|---|---|---|---|
| With silane | 71 | 53,800 | 47,000 | 88 |
| No silane | 75 | 36,800 | 26,900 | 73 |

EXAMPLE 7

Three laminates designated E, F and G were prepared according to the general technique described in Example 5.

Laminate E was prepared employing glasscloth which had been dipped in a diethyl ether solution containing 0.5% by weight of the silane prepared in Example 2 and 0.5% by weight of

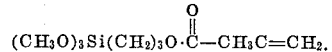

One percent by weight of t-butyl isopropyl percarbonate was added to the resin as curing agent.

Laminate F was prepared employing glasscloth which had been sized by dipping in a 1% by weight aqueous solution of

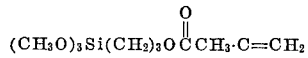

One percent by weight of the silane prepared in Example 2 was added to the resin which contained no other curing agent.

Laminate G was prepared for comparative purposes employing untreated glasscloth and 1% by weight of t-butyl isopropyl percarbonate as curing agent for the resin.

When the flexural strengths of the laminates were measured after post cure as described in Example 5 the following results were obtained.

| Laminate | Percent glass | Flexural strength, p.s.i. As prepared | Flexural strength, p.s.i. After boil | Percent retention |
|---|---|---|---|---|
| E | 64 | 58,400 | 56,600 | 97 |
| F | 60 | 65,000 | 65,500 | 100 |
| G | 63 | 41,700 | 26,800 | 64 |

That which is claimed is:

1. Organosilicon compounds of the general formula R$_n$X$_{3-n}$SiR'OOR'' wherein R represents an alkyl radical having less than 19 carbon atoms or a phenyl radical, X represents an alkoxy, alkoxyalkoxy or tertiary peroxy radical, R' represents

in which Q represents a divalent radical attached to silicon through a silicon to carbon bond, having from 2 to 10 inclusive carbon atoms and composed of carbon, hydrogen and optionally chlorine and oxygen, any oxygen present in Q being in the form of ether linkages, R'' represents a tertiary alkyl or tertiary aralkyl radical having less than 18 carbon atoms or an acyl or aroyl radical having less than 8 carbon atoms, and $n$ is 0, 1 or 2.

2. Organosilicon compounds as claimed in claim 1 wherein X represents an alkoxy or alkoxyalkoxy radical having from 1 to 3 inclusive carbon atoms.

3. Organosilicon compounds as claimed in claim 1 wherein $n$ is 0.

4. A process for the preparation of an organosilicon compound as claimed in claim 1 which comprises reacting (a) a silane of the general formula

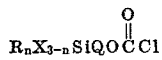

wherein R, X, Q and $n$ are as defined in claim 1, with (b) a peroxide compound of the general formula HOOG wherein G represents a tertiary alkyl radical having less than 18 carbon atoms or an acyl or aroyl radical having less than 8 carbon atoms.

References Cited
UNITED STATES PATENTS

| | | | |
|---|---|---|---|
| 2,963,501 | 12/1960 | Plueddemann | 260—448.2 B |
| 3,458,546 | 7/1969 | Dannley et al. | 260—448.2 B X |
| 3,076,852 | 2/1963 | Lohringer et al. | 260—448.2 B X |
| 2,997,497 | 8/1961 | Jenkner | 260—448.8 R |
| 2,970,982 | 2/1961 | Bluestein | 260—448.2 B X |
| 3,719,650 | 3/1973 | Joy | 260—448.2 B |
| 3,746,611 | 7/1973 | Joy | 260—448.2 B |

DANIEL E. WYMAN, Primary Examiner

P. F. SHAVER, Assistant Examiner

U.S. Cl. X.R.

161—192, Dig. 4, 193; 260—78.3 R, 80 R, 89.1, 80 C, 93.1, 448 E, 448.8 R